United States Patent [19]

Kosuda et al.

[11] Patent Number: 4,962,162

[45] Date of Patent: Oct. 9, 1990

[54] RESIN COMPOSITION OF THERMOSETTING RESIN AND THERMOPLASTIC RESIN

[75] Inventors: Hiroyuki Kosuda; Yasuhisa Nagata; Masato Andoh, all of Shizuoka, Japan

[73] Assignee: Toho Rayon Co., Ltd., Tokyo, Japan

[21] Appl. No.: 102,968

[22] Filed: Sep. 30, 1987

[30] Foreign Application Priority Data

Sep. 30, 1986 [JP] Japan ................. 61-232964
Mar. 11, 1987 [JP] Japan ................. 62-54180
Mar. 11, 1987 [JP] Japan ................. 62-54181

[51] Int. Cl.$^5$ ............... C08L 61/02; C08L 67/02; C08L 69/00; C08L 81/06

[52] U.S. Cl. .................... 525/422; 525/438; 525/463; 525/471; 525/502; 525/504; 525/506; 525/507; 525/480; 525/523; 525/530; 525/533; 525/423; 523/439; 523/468; 523/400

[58] Field of Search ............ 525/422, 438, 463, 471, 525/423, 480, 502, 504, 506, 507, 523, 530, 533; 523/439, 468, 400

[56] References Cited

U.S. PATENT DOCUMENTS

| | | | |
|---|---|---|---|
| 3,945,972 | 3/1976 | Sakamoto | 525/507 |
| 4,113,791 | 9/1978 | Smith et al. | 525/533 |
| 4,268,656 | 5/1981 | Ray-Chaudhuri et al. | 525/507 |
| 4,352,913 | 10/1982 | Zondler et al. | 525/504 |
| 4,528,346 | 7/1985 | Sugie et al. | 525/438 |
| 4,542,192 | 9/1985 | Kraft et al. | 525/508 |
| 4,567,216 | 1/1986 | Qureshi et al. | 525/423 |
| 4,579,885 | 4/1986 | Domeier et al. | 525/423 |
| 4,608,404 | 8/1986 | Gardner et al. | 525/423 |
| 4,636,535 | 1/1987 | Wang et al. | 525/423 |
| 4,656,208 | 4/1987 | Chu et al. | 525/423 |
| 4,661,559 | 4/1987 | Gardner et al. | 525/423 |
| 4,689,375 | 8/1987 | Lauterbach | 525/524 |

FOREIGN PATENT DOCUMENTS 3009687 9/1981 Fed. Rep. of Germany.
57-21428 2/1982 Japan.

OTHER PUBLICATIONS

Patent Abstract of Japan, vol. 6, No. 90 (C-104) [968], 5-27-82.

Primary Examiner—Lewis T. Jacobs
Assistant Examiner—Robert E. L. Sellers, II
Attorney, Agent, or Firm—Sughrue, Mion, Zinn, Macpeak & Seas

[57] ABSTRACT

The resin composition which contains thermosetting resin as Component (A), a thermoplastic resin as Component (B), and at least one compound selected from the group consisting of an epoxy resin capable of dissolving the thermoplastic resin and a reactive diluent possessing at least one epoxy group as Component (C) in a ratio such that the proportions of Components (A), (B), and (C) fall respectively in the ranges of 30 to 96% by weight, 2 to 50% by weight, and 2 to 49% by weight, based on the total weight of the resin composition. The resin composition is capable of producing a molded article combining the highly satisfactory mechanical and thermal properties of a thermosetting resin and the highly satisfactory toughness of a thermoplastic resin.

12 Claims, No Drawings

RESIN COMPOSITION OF THERMOSETTING RESIN AND THERMOPLASTIC RESIN

FIELD OF THE INVENTION

This invention relates to a resin composition which uniformly contains a thermosetting resin and a thermoplastic resin and permits production of a shaped article combining highly desirable mechanical and thermal properties of the thermosetting resin and highly desirable toughness of the thermoplastic resin.

BACKGROUND OF THE INVENTION

In recent years, shaped articles of thermosetting resin and composite materials using matrices of thermosetting resin have been finding extensive applications in the general industrial field and the electric field because they exhibit highly desirable dimensional stability, heat resistance, mechanical properties, chemical resistance, and weather proofing properties.

Such molded articles of thermosetting resins have low toughness and impact resistance due to the low elongation and brittleness of the resin. Thus, improvement in these properties have been desired.

In order to improve the toughness and impact resistance of molded articles of thermosetting resins, a rubber component, plastic resin component or a filler have been incorporated into the thermosetting resins.

In the case of incorporation of the rubber component into the thermosetting resin, however, since the rubber component impairs the heat resistance and mechanical properties of the molded article in spite of its ability to improve the toughness and impact resistance of the molded article, the amount of the rubber component is limited. In some applications, it is incorporated into the thermosetting resin only in a low ratio and consequently has an insufficient effect in improving the desired properties. When the thermosetting resin is mixed with a thermoplastic resin, the thermoplastic resin is added to the thermosetting resin as fine powder, or the thermoplastic resin is dissolved in a solvent and subsequently the thermosetting resin is added to the resultant solution (mixture). When the thermoplastic resin is added to a thermosetting resin in a finely divided form, the produced composition lacks homogeneity, and tends to degrade the mechanical properties of the molded article obtained therefrom. When the mixing is effected with the aid of a solvent, the method has the disadvantage that the removal of the solvent from the produced composition is required; the procedure for the production of the composition is troublesome; and the solvent remaining in the produced composition in a minute amount impairs, for example, the heat resistance of the molded article.

SUMMARY OF THE INVENTION

An object of the invention is to provide a resin composition which is free from the disadvantages mentioned above and which is produced homogeneously and easily by mixing a thermosetting resin and a thermoplastic resin in the absence of a solvent.

A further object of the invention is a resin composition that permits production of a molded article excelling in heat resistance and in mechanical properties such as toughness and impact resistance.

Additional objects and characteristics of the present invention will become apparent from the following disclosure of the invention.

It has now been found that these and other objects of the invention can be attained by the resin composition which contains thermosetting resin as Component (A), a thermoplastic resin as Component (B), and at least one compound selected from the group consisting of an epoxy resin capable of dissolving the thermoplastic resin and a reactive diluent possessing at least one epoxy group as Component (C) in a ratio such that the proportions of Components (A), (B), and (C) fall respectively in the ranges of 30 to 96% by weight, 2 to 50% by weight, and 2 to 49% by weight, based on the total weight of the resin composition.

DETAILED DESCRIPTION OF THE INVENTION

Since during the course of the production of the resin composition, Component (C) dissolves Component (B) and it further functions as a medium between Component (A) and Component (B), the production process is easy to carry out and the thermosetting resin and the thermoplastic resin are homogeneously mixed without the use of a solvent. The molded article obtained from the resin composition, therefore, retains the outstanding mechanical properties inherent in the thermosetting resin component and, at the same time, acquires a notable improvement in toughness and consequently in impact resistance.

Examples of Component (A) include an epoxy resin, a phenol resin, an bismaleimide resin, or a polyimide resin.

Examples of an epoxy resin include a bisphenol A type epoxy resin, a urethane modified bisphenol A type epoxy resin, a novolak type epoxy resin, a cresol-novolak type epoxy resin, a glycidyl amine type epoxy resin (such as a tri- or tetra-glycidyl amine type epoxy resin), and an alicyclic type epoxy resin.

Examples for each type of epoxy resins are shown in Table 1 below.

TABLE 1

| Type of epoxy resin | Trade name or code of resin | Manufacturer of epoxy resin |
|---|---|---|
| Glycidyl amine | Araldite MY 720 | Ciba Geigy |
|  | Epototo YH 434 | Toto Kasei Co. |
|  | Epototo YDM 120 | " |
| Phenol novolak | Epikote 152 | Shell Chemical Co. |
|  | Epikote 154 | " |
|  | Dow Epoxy DEN 431 | Dow Chemical Co. |
|  | Dow Epoxy DEN 438 | " |
|  | Dow Epoxy Den 439 |  |
|  | EPPN 201 | Nippon Kayaku Co. |
|  | Epiclon N 240 | Dainippon Ink Chemicals Co. |
|  | EPN 1138 | Ciba Geigy |
| Cresol novolak | Araldite ECN 1235 | Ciba Geigy |
|  | Araldite ECN 1273 | " |
|  | Araldite ECN 1280 | " |
|  | EOCN 102 | Nippon Kayaku Co. |
|  | EOCN 103 | " |
|  | EOCN 104 | " |
| Bisphenol A | Epikote 815 | Shell Chemical Co. |
|  | Epikote 828 | " |
|  | Epikote 834 | " |
| Bisphenol A | Epikote 1001 | Shell Chemical Co. |
|  | Epikote 1002 | " |
| Urethane modified Bisphenol A | Adeka Resin EPU-6 | Asahi Denka Co. |
|  | Adeka Resin EPU-10 | " |
|  | Adeka Resin EPU-15 |  |
| Alicyclic | Araldite CY-179 | Ciba Geigy Co. |
|  | Araldite CY-178 | " |

TABLE 1-continued

| Type of epoxy resin | Trade name or code of resin | Manufacturer of epoxy resin |
|---|---|---|
| | Araldite CY-182 | " |
| | Araldite CY-183 | " |

One resin or a mixture of two or more resins described above may be used.

Examples of a phenol resin include a resorcinyl type phenol resin (typified by the product of Showa Union Gosei Co., Ltd., marketed under the product code "BLSD-3135") and a novolak type phenol resin (typified by the product of Mitsui-Toatsu Chemical Inc., marketed under the product code "XL-210A" and "XL-225").

The commercially available bismaleimide resins include, for example, the product of Mitsubishi Gas Chemical Ltd. marketed under the trademark designation of "BT Resin" such as "BT-2160L", "BT-2160", "BT-2164" and "BT-2170" (these resins are reaction products of 2,2-bis(cyanatophenyl)propane and bis(4-maleimidophenyl)methane) and the product of Boots Technochemie marketed under the trademark designation of "Compimide" such as "Compimide H-800."

Examples of the polyimide resin include products developed by NASA and marketed under the product codes of "PMR-15" and "LARC-160" and the product of E. I. Du Pont Co., marketed under the product code of "NR-150."

As the thermosetting resin component (A), it is possible to use in combination two or more different resins selected from the same type or different types, such as, for example, the combination of an epoxy resin and a bismaleimide resin, to suit the particular application.

In the present invention, the thermoplastic resin as Component (B) includes, for example, a polycarbonate, a polyether ketone, a polysulfone, a polyether sulfone, a polyether imide, or an aromatic polyester. In the examples cited above, the polycarbonate, polyester, polyether sulfone, polyether imide, and aromatic polyester are preferred since they are easily dissolved in Component (C) to form a homogeneous mixture. Optionally, two or more such thermoplastic resins may be used in combination.

The thermoplastic resin as Component (B) is preferably used in the form of particles having diameters of not more than about 400 μm, preferably not more than about 100 μm. Further, it preferably has a glass transition temperature of not less than about 100° C., from the standpoint of heat resistance.

As Component (C) used in the present invention, the epoxy resin possessing an ability to dissolve a thermoplastic resin includes a glycidyl-ester type epoxy resin (typified by the product of Shell Chemical Co. marketed under the trademark designation of "Epikote 191").

A reactive diluent which is conventionally used in an epoxy resin and which possesses the ability to dissolve the thermoplastic resin used as Component (B) can also be used as Component (C), including a diepoxy compound or a monoepoxy compound. Examples of the diepoxy compound include diglycidyl aniline, diglycidyl toluidine, diglycidyl ether, butane diol glycidyl ether, 2-glycidyl phenyl glycidyl ether, and resorcinol diglycidyl ether. Examples of the monoepoxy compound include alkylphenol glycidyl ether, phenyl glycidyl ether, butyl glycidyl ether, cresol glycidyl ether, glycidyl aniline, glycidyl toluidine and styrene oxide.

Optionally, two or more such epoxy resins and/or reactive diluents may be used in combination. The epoxy resin and/or reactive diluent to be used preferably has a viscosity of not more than about 150 poises at 25° C.

Generally, Component (B) and Component (C) are appropriately selected such that the latter component is able to dissolve the former component at a lower temperature than the curing temperature of the resin composition. If this relationship is not satisfied, the resin composition produced will lack the homogeneity required, and the advantages of this invention will not be attained.

Example of preferred combinations of Component (B) and Component (C) are as follows.

TABLE 2

| Component (B) | Component (C) |
|---|---|
| PES | GAN, GOT, PGE, GE, HGE, PPG |
| PEI | GAN, GOT, PGE, HGE, PPG |
| PSu | GAN, GOT, PGE, BGE, HGE, PPG |
| PC | GOT, PGE, BGE, HGE |

(Note)
PES: Polyether sulfone (e.g., VICTREX: product of Imperial Chemical Industries Co.)
PEI: Polyether imide (e.g., ULTEM: product of General Electric Plastics)
PSu: Polysulfon (e.g., Udel: product of Union Carbide Co.)
Pc: Polycarbonate (e.g., Panlite: product of Teijin Kasei Co.)
GAN: Glycidyl aniline
GOT: Glycidyl toluidine
PGE: Phenyl glycidyl ether
BGE: Butyl glycidyl ether
GE: Glycidyl ester type epoxy resin (e.g., Epikote 191: product of Shell Chemical Co.)
HGE: Hexanediol diglycidyl ether
PPG: Polypropylene glycol diglycidyl ether It is preferred to use a bismaleimide resin comprising a bismaleimide and a biscyanic acid ester, as Component (A). The bismaleimide is preferably a compound represented by the following formula (1) or a prepolymer derived from the compound alone or derived by addition reaction of a compound such as amine to the compound:

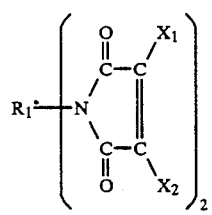

(1)

wherein $R_1$ represents a divalent aromatic or aliphatic group, and $X_1$ and $X_2$, which may be the same or different, each represents a hydrogen atom, a halogen atom or an alkyl group. Examples for each aromatic and aliphatic group includes, diphenylene ether and diphenylene methane. Examples for each halogen atom and alkyl group includes chlorine atom and methyl, respectively. The prepolymer is obtained by a heat reaction of a bismaleimide under the presence of a catalyst, if desired. The reaction may be conducted under the presence of a compound having at least one amino group, such as triethylene diamine and 2-methyl imidazole. The reaction is conducted until the viscosity of the reaction product becomes from 10 to 1000 poise at 25° C.

The biscyanic acid ester is preferably selected from the group consisting of a cyanic acid ester represented by the following formula (2) and a prepolymer derived from the cianic acid ester.

$$R_2\text{—O—C} \uparrow N)_2 \tag{2}$$

wherein $R_2$ represents a divalent aromatic group, n is an integer of from 2 to 10, and —O—C=N bonds directly to the aromatic ring group represented by $R_2$. Examples for $R_2$ include diphenylene propane.

Component (A) containing the bismaleimide resin further may contain an epoxy resin, preferably in an amount of from about 5 to 50 weight % based on the total weight of Component (A).

In the combination of Component (A)/Component (B)/Component (C), for the purpose of simplifying the procedure for providing the resin composition, it is desirable to dissolve Component (B) initially in Component (C) and subsequently to add Component (A) to the resulting solution. These three components may be mixed simultaneously.

The mixing ratio of Component (A)/Component (B)/Component (C) is such that the proportions of Components (A), (B), and (C) will respectively fall in the ranges of about 30 to 96% by weight, about 2 to 50% by weight, and about 2 to 49% by weight, based on the total weight of Components (A), (B) and (C).

If the proportion of Component (A) falls outside the specified range, the object of this invention cannot be attained. If the proportion of Component (B) exceeds about 50% by weight, the produced resin composition possesses high melt viscosity making the mixing of the components, the impregnation of fibers with the mixed components, and the forming of the mixed components into a molded article difficult, rendering the production of a highly desirable molded article impracticable. If the proportion of Component (C) exceeds about 49% by weight, there is the disadvantage that the heat resistance of the molded article is lowered and the mechanical properties thereof are adversely affected. The object of the present invention is not attained when the proportions of Component (B) and Component (C) are each not at least about 2% by weight. The weight ratio of Component (B)/Component (C) is preferably not more than about 2. If this ratio exceeds about 2, the produced composition possesses a viscosity so high as to make its handling difficult and, when it is used as a prepreg, entails a disadvantage that its ability to impregnate fibers is lowered and its tackiness is insufficient. Moreover, the molded article obtained from the composition has inferior mechanical properties. The necessary amount of Component (C) is determined depending on the amount of Component (B), and it is preferably restricted to the smallest allowable level at which the produced resin composition has the desired homogeneity. The amount of Component (B) and Component (C) is preferably from about 10 to 30% by weight and about 5 to 30% by weight, respectively, based on the total weight of Components (A), (B) and (C).

The resin composition of the present invention, depending on the purpose, the use, and the conditions of use, may have incorporated therein a reinforcing material such as reinforcing fibers, for example, glass fibers, carbon fibers, aromatic polyamide fibers, or metal fibers in addition to the essential components thereof mentioned above. A mixture of these two or more type of fibers may be used.

The reinforcing fibers preferably have a tensile strain of at least about 1.3%. Usually glass fibers and aromatic fibers have a tensile strain of at least about 2.5%. When carbon fibers having a tensile strain of less than about 1.3% are used, a cured composite having insufficient impact resistance is obtained. In order to obtain a composite having a high mechanical properties, it is preferable to use carbon fibers having a tensile strength of at least about 400 kgf/mm$^2$ and a tensile modulus of elasticity of at least about 30,000 kg/mm$^2$. The reinforcing fibers usually are used up to about 70 volume % based on the total volume of the resin composition (including fibers).

It may further optionally have incorporated therein, for example, a material which increases the toughness of the molded articles, such as butadiene-acrylonitrile rubber, a flame-retardant such as antimony trioxide, a filler such as powdered silica, a coloring agent. These additive materials are incorporated in the composition in an amount up to about 5% by weight based on the weight of the total weight of the composition (including the additive materials).

Some of the resins used in this invention require use of a cross-linking reaction initiator, a curing agent, and a curing accelerator and others are of a kind not requiring these agents. Thus, these resins may be suitably selected as occasion demands.

As a cross-linking reaction initiator, a curing agent, and a curing accelerator, materials which are conventionally used for such purposes can be used in the present invention. A curing agent for an epoxy resin and a curing accelerator for other thermosetting resins are typically used in amounts of from about 25 to 45% by weight and 0 to about 3% by weight, respectively, based on the total weight of thermosetting resin in the composition.

Examples of a cross-linking reaction initiator include an amine, a peroxide, and an organic metal complex.

Examples of a curing agent for an epoxy resin include an aromatic amine such as m-phenylene diamine, diaminodiphenyl methane, diaminodiphenyl sulfone, and m-xylene diamine; a boron trifluoride complex such as BF3 monoethylamine and BF3 benzylamine; an acid anhydride such as phthalic acid anhydride, trimellitic acid anhydride, pyromellitic acid anhydride, and benzophenone, tetracarboxylic acid anhydride; an imidazole such as 2-ethyl-4-methylimidazole, 2-ethylimidazole, 2,4-dimethylimidazole, and 2-phenylimidazole, dicyandiamide, and a dibasic acid dihydrazide. Two or more curing agent may be used in combination.

Examples of a curing accelerator include a urea compound such as 3-(3,4-dichlorophenyl)-1,1-dimethyl urea, an organic metal salt such as Co(III) or Fe(III)acetylacetonate, a peroxide such as dicumyl peroxide, and an imidazole compound such as 2-ethyl-4-methylimidazole and 2-phenyl-4-methyl-5-hydroxymethylimidazole. A curing accelerator is used in combination with a curing agent.

The resin composition of the present invention can be prepared, for example, by a method described below.

All of the components are supplied to a kneading device and kneaded therein usually under application of heat, desirably in an atmosphere of inert gas. The heating temperature used in this case is lower than the temperature at which the thermosetting resin begins to cure.

Alternatively, for example, Component (B) can be dissolved in Component (C) and subsequently the resultant solution is kneaded with Component (A), when necessary, in combination with a curing agent.

These steps are carried out generally at a temperature in the range of from about 20° to 200° C., preferably at a temperature in the range of from about 50° to 150° C., for 0.5 to 5 hours.

When a prepreg is formed by impregnating reinforcing fibers with the resin composition of the present invention, the impregnation can be carried out by the conventional hot melt method which is disclosed in, for example, U.S. patent application Ser. No. 761,290.

In the hot melt method a fiber strand or fabric is impregnated with a resin composition, the viscosity of which is decreased by heating to a proper temperature (not higher than the curing temperature of the resin composition) so that impregnation can be conducted. The impregnation is conducted by dipping a fiber strand or fabric into the resin composition, or by placing fiber strands or a fabric in contact with a film of the resin composition and heat-pressing them.

Thus a prepreg having reinforcing fibers therein is produced, and it is used for preparation of a molded article (composite) by curing the resin composition.

For forming the resin composition of the present invention to a molded article, any conventional method can be used including thermal curing, ultraviolet curing, appropriate combination of production method and curing method can be easily selected, depending on the particular kind of the thermosetting resin being used in the resin composition.

Since Component (C) dissolves Component (B) and the mixture of Component (C) and Component (B) is miscible with the thermosetting resin Component (A), a homogeneous mixture of the three components is obtained. Moreover, the resin composition does not require a solvent and, therefore, does not have the disadvantageous of a residual solvent. It is a highly satisfactory resin composition combining highly desirable heat resistance due to the thermosetting resin and highly desirable toughness and impact resistance due to the thermoplastic resin.

In some cases Component (B) precipitates in the form of fine particles when the homogeneous mixture of Component (B) and Component (C) is mixed with Component (A). Of course, even in this case, the three components are mixed with much higher homogeneity than when Component (A) and Component (B) are merely mixed with each other.

The resin composition, in the form of either simply molded articles or molded articles made of composite material consisting of the resin composition and reinforcing fibers, will find extensive applications, for example, in the electric field, the medical field, the space and aeronautic field, the civil engineering and construction fields, and the general industrial field.

Now, the present invention will be described more specifically below with reference to working examples and comparative experiments, but the present invention is not to be construed as being limited thereto.

In Examples and Comparative Examples, all parts percents and ratios, including the mixing ratio of materials used in a resin composition, are by weight unless otherwise specified.

In the Examples and Comparative Examples, the glass transition temperature was measured using a differential scattering calorimeter, and fracture toughness was measured by the double cantilever tear test (ASTM D3433-75).

EXAMPLES 1-5

Various epoxy resins were used as Component (A). Components (A), (B), and (C), varying in kind and mixing ratio from one combination to another as indicated in Table 2, were weighed out and placed in a beaker. In the beaker, they were stirred and heated at 110° C. for one hour to produce a homogeneous mixture of Components (A), (B), and (C).

Then, this mixture and an epoxy resin curing agent such as diaminodiphenyl sulfone added thereto were heated and mixed at 100° C. for one hour to produce a thermosetting resin composition This composition was placed in a silicone rubber mold and cured therein at 180° C. for two hours under application of pressure (5 kg/cm$^2$), to obtain a cured article made of the resin composition.

A test piece was cut from the cured article and tested for glass transition temperature, fracture toughness, and Izod impact energy. The results are shown in Table 3 below.

COMPARATIVE EXAMPLES 1-7

Resin compositions were produced by following the procedure of Examples 1 to 5, except that only Component (A) was used (Comparative Examples 1-5); Component (B) was omitted (Comparative Example 6); and a butadiene-acrylonitrile rubber (product of Ube Industries, Ltd. marketed under trademark designation of "CTBN, Hycar 1300×13") was used in the place of Component (B) (Comparative Example 7). The resin compositions were similarly processed to produce cured articles, which were tested for the same physical properties. The results are shown in Table 3.

From the results, it is clear that the products of Examples 1-5 were superior to those of Comparative Examples 1-7 in terms of fracture toughness, and Izod impact energy. The product of Comparative Example 7 was satisfactory in toughness but was notably deficient in heat resistance.

TABLE 3

| | Mixing ratio | | | | | | | | |
|---|---|---|---|---|---|---|---|---|---|
| | Component (A) | | | Component (B) | | | Component (C) | | |
| Example No. | Araldite MY 720 | Epikote 828 | Epikote 152 | Polyether sulfone | Polyether imide | Polysulfone | Diglycidyl ether | Diglycidyl aniline | Phenyl glycidyl ether |
| 1 | 40 | 10 | 10 | 20 | — | — | 20 | — | — |
| 2 | 50 | — | 10 | — | — | 20 | — | 20 | — |
| 3 | 30 | 10 | 30 | — | 15 | — | — | — | 15 |
| 4 | 60 | — | — | 10 | — | 10 | — | 10 | 10 |
| 5 | 55 | 10 | 10 | 5 | 10 | — | — | 10 | — |
| Comp. | 60 | 20 | 20 | — | — | — | — | — | — |

TABLE 3-continued

| | | | | | | | | | |
|---|---|---|---|---|---|---|---|---|---|
| Ex. 1 | | | | | | | | | |
| Comp. Ex. 2 | 70 | — | 30 | — | — | — | — | — | — |
| Comp. Ex. 3 | 40 | 20 | 40 | — | — | — | — | — | — |
| Comp. Ex. 4 | 100 | — | — | — | — | — | — | — | — |
| Comp. Ex. 5 | 60 | 20 | 20 | — | — | — | — | — | — |
| Comp. Ex. 6 | 60 | 10 | 10 | — | — | — | — | 20 | — |
| Comp. Ex. 7 | 40 | 10 | 10 | — | — | — | — | 20 | — |

| | Mixing ratio | | | | Property | | |
|---|---|---|---|---|---|---|---|
| | Curing agent | | | Other | Glass | | Izod |
| Example No. | Diamino-diphenyl sulfone | Dicyan di-amide | $BF_3$·mono-ethyl amine | CTBN Hycar 1300 × 13 | transition temperature (°C.) | Fracture toughness (Joule/$m^2$) | impact energy (Joule/$m^2$) |
| 1 | 40 | — | — | — | 200 | 210 | 30 |
| 2 | 40 | 1.0 | 0.2 | — | 205 | 180 | 26 |
| 3 | 40 | — | 0.2 | — | 210 | 120 | 24 |
| 4 | 40 | — | — | — | 200 | 160 | 28 |
| 5 | 40 | 1.0 | — | — | 210 | 150 | 24 |
| Comp. Ex. 1 | 50 | — | — | — | 215 | 70 | 15 |
| Comp. Ex. 2 | 50 | 1.0 | 0.2 | — | 215 | 65 | 14 |
| Comp. Ex. 3 | 50 | — | 0.2 | — | 215 | 65 | 13 |
| Comp. Ex. 4 | 50 | — | — | — | 220 | 60 | 12 |
| Comp. Ex. 5 | 50 | 1.0 | — | — | 215 | 66 | 13 |
| Comp. Ex. 6 | 50 | 1.0 | 0.2 | — | 210 | 68 | 14 |
| Comp. Ex. 7 | 40 | 1.0 | 0.2 | 20 | 150 | 180 | 20 |

EXAMPLES 6–10 AND COMPARATIVE EXAMPLES 8–12

Cured articles were obtained by following the procedures of Examples 1–5, except that a phenol resin or bismaleimide resin shown in Table 4 below was used as Component (A). The resin compositions using the phenol resin were further post-cured by eight hours standing at 220° C. The cured articles were tested for the same properties as mentioned above. The results are shown in Table 4.

From the results, it is evident that the products of Example 6–10 were superior to those of Comparative Examples 8–12 in terms of fracture toughness and Izod impact energy.

TABLE 4

| | Mixing ratio | | | | | | | | |
|---|---|---|---|---|---|---|---|---|---|
| | Component (A) | | | | | Component (B) | | | Component (C) | |
| Example No. | BLSD-3135 | XL-225 | Epikote 828 | BT-2160 | Comp-imide H-800 | Poly-ether sulfone | Poly-ether imide | Poly-sul-fone | Digly-cidyl aniline | Cresol glycidyl ether |
| 6 | 60 | — | — | — | — | 10 | 10 | — | 20 | — |
| 7 | — | 75 | — | — | — | — | 15 | — | — | 10 |
| 8 | — | — | — | 60 | — | 10 | — | 10 | 20 | — |
| 9 | — | — | 10 | 50 | — | 20 | — | — | — | 20 |
| 10 | — | — | — | — | 60 | — | — | 20 | 20 | — |
| Comp. Ex. 8 | 100 | — | — | — | — | — | — | — | — | — |
| Comp. Ex. 9 | — | 100 | — | — | — | — | — | — | — | — |
| Comp. Ex. 10 | — | — | — | 100 | — | — | — | — | — | — |
| Comp. Ex. 11 | — | — | 20 | 60 | — | — | — | — | 20 | — |
| Comp. Ex. 12 | — | — | — | — | 80 | — | — | — | — | — |

| | Mixing ratio | | | Property | | |
|---|---|---|---|---|---|---|
| | Curing accelerator | | | Glass | | Izod |
| Example No. | Dicumyl per-oxide | Diaza-bicyclo-octane | Fe(III) acetyl-acetonate | transition temperature (°C.) | Fracture toughness (Joule/$m^2$) | impact energy (Joule/$m^2$) |
| 6 | — | — | — | 230 | — | 10 |
| 7 | — | — | — | 230 | — | 8 |
| 8 | 1.0 | — | 0.01 | 205 | 160 | 24 |

TABLE 4-continued

| | | | | | | |
|---|---|---|---|---|---|---|
| 9 | 1.0 | — | 0.01 | 200 | 180 | 28 |
| 10 | — | 0.3 | — | 270 | 83 | 18 |
| Comp. Ex. 8 | — | — | — | 210 | — | 4 |
| Comp. Ex. 9 | — | — | — | 250 | — | 3 |
| Comp. Ex. 10 | 1.0 | — | 0.01 | 210 | 53 | 10 |
| Comp. Ex. 11 | 1.0 | — | 0.01 | 215 | 60 | 12 |
| Comp. Ex. 12 | — | 0.3 | — | 280 | 45 | 10 |

EXAMPLES 11-15 AND COMPARATIVE EXAMPLES 13-17

Resin compositions for prepregs were obtained by using the materials shown in Table 5 below as Components (A), (B), and (C) in mixing ratios shown in Table 5, to obtain homogeneous mixtures, and by incorporating curing promoters shown in Table 5 in amounts shown in Table 5.

Resin films 60 μm thick were obtained from the thus-obtained compositions using a film coater. Carbon fibers ("Besfight IM-500", product of Toho Rayon Co., Ltd.) having a tensile strength of 500 kgf/mm$^2$ and a modulus of elasticity of 30,000 kg/mm$^2$ were placed on each film and the resin composition was impregnated therein by heating to a temperature of 100° C. and pressing at 4 kg/cm$^2$ to obtain a unidirectional (direction of fibers) prepreg having a weight of 150 g/m$^2$ and containing 34% by weight of the resin.

From each prepreg, necessary number of sheets were obtained by cutting, and they were laminated. The laminated product was heat-cured to obtain a molded plate by autoclave molding at 180° C., 4 kg/cm$^2$. Test pieces were obtained by cutting the plate, and the glass transition temperature, the interlaminar shear strength (ILSS; measured according to ASTM D2344 with respect to the fiber direction), the compressive strength (measured with respect to the fiber direction according to ASTM D3410), the damaged area resulting from an impact of 340 kgcm/cm and the compressive strength after the impact were measured. The test piece for subjecting the impact test was prepared by laminate 16 prepreg sheets in such a manner that directions of carbon fibers in the prepregs become 45°/0°/−45°/90°/90°/−45°/0°/45°/45°/0°/−45°/90°/90°/−45°/0°/45°. The results obtained are shown in Table 5.

COMPARATIVE EXAMPLES 13-17

Comparative test pieces were produced in the same manner as in Examples 11-15 except that Component (B) or Components (B) and (C) were not used. The properties of the comparative test pieces were measured in the same manner as in Examples 11-15, and the results are shown in Table 5.

As can be seen in Table 5, there were no remarkable differences between the thermal characteristics of the test pieces of Examples 11-15 and those of the Comparative Examples. However, the damaged areas caused by the impact were much smaller in the test pieces of Examples 11-15 than those of Comparative Examples 13-17, and the compressive strengths after impact were much higher in the samples of Examples 11-15 than those of Comparative Examples 13-17.

These results demonstrate that the composites obtained from the composition of the present invention were superior to those of Comparative Examples 13-17 in impact resistance.

EXAMPLES 16 AND 17

Using the materials and mixing ratios shown in Table 5 below, each Component (B) was mixed with each Component (C) at 110° C. for one hour while stirring.

Even when Component (B) was used in a high mixing ratio (Example 6), or when Component (C) was used in a small mixing ratio, a homogenous mixture could be obtained.

To each of the above-described mixtures, each Component (A) and curing accelerator shown in Table 5 were added in the mixing ratio shown in Table 5, and the resultant mixtures were mixed by using a roll mill to obtain resin compositions for prepregs. Using these compositions, prepregs were obtained in the same manner as in Examples 11-15, and further molded plates were obtained from the prepregs in the same manner as in Examples 11-15. The composite properties were measured in the same manner as in Examples 11-15, and the results are shown in Table 5. From the results it can be seen that the composites obtained from the composition of the present invention had excellent impact resistance.

TABLE 5

| | Mixing ratio | | | | | | | | | |
|---|---|---|---|---|---|---|---|---|---|---|
| | Component (A) | | | | | | | Component (B) | | |
| Example No. | Araldite MY 720 | YDM 120 | Epikote 828 | Epikote 1001 | Epikote 152 | DEN 485 | EPU-6 | PES | PEI | PSu |
| 11 | 40 | — | 10 | — | 10 | — | 10 | 15 | — | — |
| 12 | 40 | 10 | — | — | 10 | — | — | — | 20 | — |
| 13 | 40 | — | 10 | — | 20 | — | — | 10 | 10 | — |
| 14 | 50 | — | — | — | 10 | — | — | — | 20 | — |
| 15 | 40 | 10 | 10 | — | 10 | — | 10 | — | 5 | 5 |
| 16 | 20 | — | — | — | 20 | — | — | 40 | — | — |
| 17 | 45 | — | 5 | — | 10 | — | 10 | 10 | 10 | — |
| Comp. Ex. 13 | 90 | — | — | — | — | 10 | — | — | — | — |
| Comp. | 50 | 20 | — | 15 | — | 15 | — | — | — | — |

TABLE 5-continued

| Example No. | | | | | | | | | | |
|---|---|---|---|---|---|---|---|---|---|---|
| Ex. 14 Comp. Ex. 15 | 70 | 10 | — | 10 | — | 8 | — | — | 1 | — |
| Comp. Ex. 16 | 70 | — | 5 | 10 | 10 | 5 | 10 | — | — | — |
| Comp. Ex. 17 | 60 | — | 10 | 15 | 10 | 15 | — | — | — | — |

| | Mixing ratio | | | | | | |
|---|---|---|---|---|---|---|---|
| | Component (C) | | | Curing agent | | | Other |
| Example No. | GAN | PGE | PPG | Diamino-diphenyl-sulfone | Dicyan diamide | BF$_3$.mono-ethyl-amine | Dichloro-phenyl di-methyl urea | CTBN Hycar 1300 × 13 |
| 11 | 15 | — | | 35 | 1.0 | 0.2 | 1.0 | — |
| 12 | — | 20 | | 30 | 1.0 | 0.2 | 1.0 | — |
| 13 | 20 | — | | 30 | 1.0 | 0.2 | 1.0 | 10 |
| 14 | — | — | 20 | 33 | 1.0 | 0.2 | 1.0 | 10 |
| 15 | 10 | — | — | 38 | 1.0 | 0.2 | 1.0 | 10 |
| 16 | — | 20 | | 20 | — | — | — | — |
| 17 | 10 | — | | 30 | 1.0 | 0.2 | 1.0 | 10 |
| Comp. Ex. 13 | — | — | | 45 | — | — | — | — |
| Comp. Ex. 14 | — | — | | 40 | 1.0 | 0.2 | 1.0 | — |
| Comp. Ex. 15 | — | 1 | | 40 | 1.0 | 0.2 | 1.0 | 10 |
| Comp. Ex. 16 | 10 | — | | 40 | 1.0 | 0.2 | 1.0 | 10 |
| Comp. Ex. 17 | — | 10 | | 40 | 1.0 | 0.2 | 1.0 | 10 |

| | Property | | | | | |
|---|---|---|---|---|---|---|
| Example No. | Glass transition temperature (°C.) | ILSS at 23° C. (kgf/mm$^2$) | ILSS at 82° C. (kgf/mm$^2$) | Compressive strength at 23° C. (kgf/mm$^2$) | Damaged area by impact (cm$^2$) | Compressive strength after impact (kgf/mm$^2$) |
| 11 | 205 | 11 | 8.0 | 140 | 12 | 23 |
| 12 | 205 | 11 | 8.5 | 140 | 10 | 25 |
| 13 | 200 | 11 | 8.0 | 140 | 10 | 24 |
| 14 | 200 | 11 | 8.0 | 140 | 7 | 27 |
| 15 | 205 | 11 | 8.0 | 145 | 15 | 21 |
| 16 | 200 | 10 | 8.0 | 130 | 8 | 27 |
| 17 | 205 | 10 | 8.0 | 140 | 9 | 26 |
| Comp. Ex. 13 | 220 | 13 | 10 | 150 | 40 | 12 |
| Comp. Ex. 14 | 215 | 13 | 9.0 | 140 | 35 | 12 |
| Comp. Ex. 15 | 210 | 12 | 8.5 | 140 | 25 | 14 |
| Comp. Ex. 16 | 205 | 11 | 8.5 | 140 | 30 | 13 |
| Comp. Ex. 17 | 205 | 11 | 8.5 | 140 | 30 | 13 |

EXAMPLES 18–24 AND COMPARATIVE EXAMPLES 18–22

The same experiments as in Examples 11–17 and Comparative Examples 13–17 were conducted except that materials and mixing ratios shown in Table 6 below were used. The results are shown in Table 6.

From the results it can be seen that the composites obtained from the composition of the present invention had excellent impact resistance.

TABLE 6

| | Mixing ratio | | | | | | | | | | | | | | Curing accelerator | |
|---|---|---|---|---|---|---|---|---|---|---|---|---|---|---|---|---|
| | Component (A) | | | | | | | Component (B) | | | Component (C) | | | Other | | |
| Example No. | BT-2160L | BT-2160 | BT-2164 | BT-2170 | Epi-kote 828 | Epikote 1001 | Epi-kote 152 | PES | PEI | PSu | GAN | PGE | PPG | CTBN Hycar 1300 × 13 | Dicumyl peroxide | Co(III) acetyl-acetonate |
| 18 | 90 | — | — | — | 10 | — | — | — | 15 | — | 10 | — | — | — | 0.1 | — |
| 19 | 80 | 10 | — | — | 10 | — | — | 15 | — | — | 10 | — | — | — | 0.1 | 0.01 |
| 20 | 80 | 10 | — | — | 10 | — | — | — | 10 | 10 | 20 | — | — | — | 0.1 | — |
| 21 | 70 | — | — | 10 | — | 10 | 10 | — | 15 | — | — | — | 15 | — | 0.1 | — |
| 22 | 70 | 10 | 10 | — | — | — | 10 | 10 | 10 | — | — | 10 | — | 5 | 0.1 | — |
| 23 | 80 | — | — | — | 20 | — | — | 40 | — | — | — | 20 | — | — | 0.1 | 0.01 |
| 24 | 70 | — | 10 | — | 10 | — | 10 | 10 | 10 | — | 5 | 10 | — | — | 0.1 | — |
| Comp. Ex. 18 | 90 | — | — | — | 10 | — | — | — | — | — | — | — | — | — | 0.1 | — |
| Comp. | 80 | 10 | — | — | 10 | — | — | — | — | — | — | — | — | — | 0.1 | — |

TABLE 6-continued

| | | | | | | | | | | | | | | | | |
|---|---|---|---|---|---|---|---|---|---|---|---|---|---|---|---|---|
| Ex. 19 | | | | | | | | | | | | | | | | |
| Comp. Ex. 20 | 70 | 10 | — | 10 | — | 10 | 10 | — | — | — | — | — | — | 5 | 0.1 | — |
| Comp. Ex. 21 | 90 | — | — | — | 10 | — | — | — | — | — | 10 | — | — | — | 0.1 | — |
| Comp. Ex. 22 | 80 | 10 | — | — | 10 | — | — | — | — | — | — | 10 | — | — | 0.1 | — |

| Example No. | Glass transition temperature (°C.) | ILSS at 23° C. (kgf/mm²) | ILSS at 82° C. (kgf/mm²) | Compressive strength at 23° C. (kgf/mm²) | Damaged area by impact (cm²) | Compressive strength after impact (kgf/mm²) |
|---|---|---|---|---|---|---|
| 18 | 215 | 12 | 8.0 | 140 | 8 | 27 |
| 19 | 215 | 12 | 8.0 | 140 | 10 | 22 |
| 20 | 210 | 11 | 7.5 | 135 | 10 | 23 |
| 21 | 215 | 12 | 8.0 | 140 | 9 | 25 |
| 22 | 210 | 11 | 7.5 | 135 | 8 | 26 |
| 23 | 200 | 10 | 7.0 | 130 | 6 | 28 |
| 24 | 210 | 11 | 7.5 | 140 | 10 | 21 |
| Comp. Ex. 18 | 220 | 13 | 8.5 | 150 | 25 | 13 |
| Comp. Ex. 19 | 220 | 13 | 8.5 | 140 | 25 | 12 |
| Comp. Ex. 20 | 210 | 12 | 8.0 | 140 | 20 | 14 |
| Comp. Ex. 21 | 215 | 11 | 8.0 | 140 | 30 | 12 |
| Comp. Ex. 22 | 215 | 11 | 8.0 | 140 | 30 | 12 |

While the invention has been described in detail and with reference to specific embodiments thereof, it will be apparent to one skilled in the art that various changes and modifications can be made therein without departing from the spirit and scope thereof.

What is claimed is:

1. A resin composition containing a homogenous mixture of Components (A), (B) and (C) wherein said composition comprises (1) Component (C) as a reactive diluent and resin components consisting of Components (A) and (B), or (2) resin components consisting of Components (A), (B) and (C), wherein a thermosetting resin is Component (A), a thermoplastic resin is Component (B), and at least one compound selected from the group consisting of an epoxy resin capable of dissolving the thermoplastic resin and a reactive diluent possessing at least one epoxy group is Component (C) in a ratio such that the proportions of Components (A), (B) and (C) fall respectively in the ranges of 30 to 85% by weight, 10 to 30% by weight, and 5 to 49% by weight, based on the total weight of the resin composition, wherein the weight ratio of Component (B) to Component (C) is from about 0.2 to about 2; and wherein said thermosetting resin as Component (A) is an epoxy resin selected from the group consisting of a bisphenol A epoxy resin, a urethane modified bisphenol A epoxy resin, a novolak epoxy resin, a cresol novolak epoxy resin, and a glycidyl amine epoxy resin; and wherein said thermoplastic resin as Component (B) is a resin selected from the group consisting of a polycarbonate, a polyether ketone, a polysulfone, a polyether sulfone, a polyether imide and an aromatic polyester; and wherein said at least one of the epoxy resin and the reactive diluent as Component (C) comprises at least one compound selected from the group consisting of glycidyl aniline, phenyl glycidyl ether, glycidyl ester epoxy resin, hexanediol diglycidyl ether, and polypropylene glycol glycidyl ether.

2. The resin composition as in claim 1, wherein said glycidyl amine epoxy resin is a resin selected from the group consisting of a triglycidyl amine epoxy resin or a tetraglycidyl amine epoxy resin.

3. The resin composition as in claim 1, wherein said epoxy resin as Component (C) is selected from the group consisting of a glycidyl ester epoxy resin.

4. The resin composition as in claim 1, wherein said thermoplastic resin as Component (B) is a polyether sulfone.

5. The resin composition as in claim 1, wherein said thermoplastic resin as Component (B) is a polyether imide.

6. The resin composition as in claim 1, wherein said thermoplastic resin as Component (B) is polysulfone.

7. The resin composition as in claim 1, wherein said thermoplastic resin as Component (B) is a polycarbonate.

8. The resin composition as in claim 1, wherein Components (B) and (C) fall respectively within the ranges of from 10 to 30% by weight and 5 to 30% by weight.

9. The resin composition as in claim 1, further comprising a reinforcing fiber.

10. The resin composition as in claim 14, wherein said fiber is selected from the group consisting of a carbon fiber, a glass fiber and an aromatic polyamide fiber.

11. The resin composition as in claim 14, wherein the amount of said reinforcing fiber is up to about 70% by volume based on the total volume of said composition.

12. The resin composition as in claim 1, further comprising at least one of a cross-linking reaction initiator, a curing agent, and a curing accelerator.

* * * * *

UNITED STATES PATENT AND TRADEMARK OFFICE
CERTIFICATE OF CORRECTION

PATENT NO. : 4,962,162

DATED : October 9, 1990

INVENTOR(S) : Kosuda et al

It is certified that error appears in the above-identified patent and that said Letters Patent is hereby corrected as shown below:

Column 16, line 55, "claim 14" should be --claim 9--.

Column 16, line 58, "claim 14" should be --claim 9--.

Signed and Sealed this

Thirtieth Day of March, 1993

Attest:

STEPHEN G. KUNIN

Attesting Officer

Acting Commissioner of Patents and Trademarks